United States Patent
Togo Peraza et al.

(10) Patent No.: US 9,768,611 B2
(45) Date of Patent: Sep. 19, 2017

(54) APPARATUS AND METHOD FOR REVERSE BATTERY PROTECTION

(71) Applicant: Continental Automotive Systems, Inc., Auburn Hills, MI (US)

(72) Inventors: Luis Roberto Togo Peraza, Zapopan (MX); Lothar Erle, Kelkheim (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 403 days.

(21) Appl. No.: 14/624,706

(22) Filed: Feb. 18, 2015

(65) Prior Publication Data
US 2016/0241013 A1    Aug. 18, 2016

(51) Int. Cl.
*H02H 3/18* (2006.01)
*H02H 11/00* (2006.01)
*H02H 9/04* (2006.01)

(52) U.S. Cl.
CPC .......... *H02H 11/003* (2013.01); *H02H 9/047* (2013.01); *H02H 9/041* (2013.01)

(58) Field of Classification Search
CPC ....... H02H 3/18; H02H 11/002; H02H 11/003
USPC .......................................................... 361/84
See application file for complete search history.

(56) References Cited

U.S. PATENT DOCUMENTS

| | | | | |
|---|---|---|---|---|
| 5,517,379 A * | 5/1996 | Williams | ............. | H02H 11/003 307/127 |
| 5,640,071 A * | 6/1997 | Malaspina | ................. | H02J 7/14 318/139 |
| 5,781,390 A * | 7/1998 | Notaro | ................... | H02H 9/046 307/127 |
| 7,554,777 B2 * | 6/2009 | Fukami | ..................... | G05F 1/56 361/18 |
| 2003/0081365 A1 * | 5/2003 | He | ........................ | H02H 11/003 361/82 |
| 2004/0150927 A1 * | 8/2004 | Strayer | ................ | H02H 11/003 361/82 |
| 2007/0064362 A1 * | 3/2007 | Migliavacca | ........ | H02H 11/003 361/82 |
| 2009/0160500 A1 * | 6/2009 | Niculae | ................... | H02M 1/08 327/109 |
| 2011/0026171 A1 * | 2/2011 | Pavlin | ................ | H01L 27/0248 361/20 |
| 2011/0051303 A1 * | 3/2011 | Migliavacca | ......... | H02J 7/0031 361/91.5 |

* cited by examiner

*Primary Examiner* — Dharti Patel

(57) ABSTRACT

An apparatus for providing protection to an electric circuit includes a P-channel MOSFET; a freewheeling diode coupled to a drain of the P-channel MOSFET and coupled to a load; and a charge pump coupled to a gate of the P-channel MOSEFT. In a normal operating mode, the charge pump receives a voltage from a voltage regulator, and is configured to multiply and reverses the polarity of the voltage to supply to the gate of the MOSFET. In a reverse battery operating mode, the charge pump receives no voltage from the voltage regulator to supply to the gate of the MOSFET causing the MOSFET to deactivate such that when the MOSFET deactivates, current is prevented from flowing through the freewheeling diode to protect the freewheeling diode.

14 Claims, 2 Drawing Sheets

US 9,768,611 B2

APPARATUS AND METHOD FOR REVERSE BATTERY PROTECTION

TECHNICAL FIELD

This application relates to electrical circuits and protecting these electrical circuits.

BACKGROUND OF THE INVENTION

High Side (HSD) power outputs are used to provide power to a load. A common problem when using HSD power outputs is the need of an external freewheeling diode to protect against the high energy inductive loads generate when these are switched off. In some examples, the inductive loads include either real inductive loads (e.g., wiper motors, washer motors, solenoids, relays, to mention a few examples) or long harnesses with significant inductivity (e.g., trailer outputs on commercial vehicles with harness length of more about 40 m).

Normally, HSD outputs cannot handle the high energy produced by inductive loads having either high currents (e.g., a short circuit of a trailer output) or high inductivity (e.g., high inductivity relay) or both (e.g., wiper motor in a stalled condition).

When freewheeling diodes are used in combination with HSD outputs one problem is normally the protection of the freewheeling diode and the HSD against reverse battery conditions (e.g., commercial vehicles can go down to approximately −36V). Several previous approaches exist to protect the freewheeling diode and the HSD, but none of these approaches provide sufficient protection against high current and high inductivity events (e.g., wiper motor in a stalled condition or trailer outputs being short circuited with a 40 m long harness (trailer outputs normally have high short circuit currents >200 A)).

The problems of previous approaches have resulted in some user dissatisfaction with these previous approaches.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches provide a reliable protection for systems using freewheeling diodes while keeping system costs as low as possible. The circuits so provided use a MOSFET to clamp high energy inductivity transients without adding power dissipation in normal operation modes. Power is only dissipated when the freewheeling diode is clamping. Low cost and low part count are also provided. In these regards, a single MOSFET can be shared among multiple outputs. The present approaches provide reverse battery protection up to high negative voltages and this may depend on the maximum drain to source voltage (VDS) of the MOSFET.

In many of these embodiments, an apparatus for providing protection to an electric circuit includes a P-channel MOSFET; a freewheeling diode coupled to a drain of the P-channel MOSFET and coupled to a load; and a charge pump coupled to a gate of the P-channel MOSFET. In a normal operating mode, the charge pump receives a voltage from a voltage regulator, and is configured to multiply and reverses the polarity of the voltage to supply to the gate of the MOSFET. In a reverse battery operating mode, the charge pump receives no voltage from the voltage regulator to supply to the gate of the MOSFET causing the MOSFET to deactivate such that when the MOSFET deactivates, current is prevented from flowing through the freewheeling diode to protect the freewheeling diode.

In some aspects, when a driver switch to a load opens, the MOSFET and freewheeling diode cooperate to recirculate current in the load. In other examples, the load comprises a harness, a windshield wiper motor, washer motor, or solenoid.

In other aspects, the MOSFET comprise a low RDS-on resistance. In some examples, the low RDS-on resistance is between approximately 100 ohms and 0.001 ohms.

In other examples, the apparatus further includes a voltage divider network coupled to the gate of the MOSFET. In other examples, the apparatus further includes a voltage protection diode coupled to the gate of the MOSFET.

Figure 1:
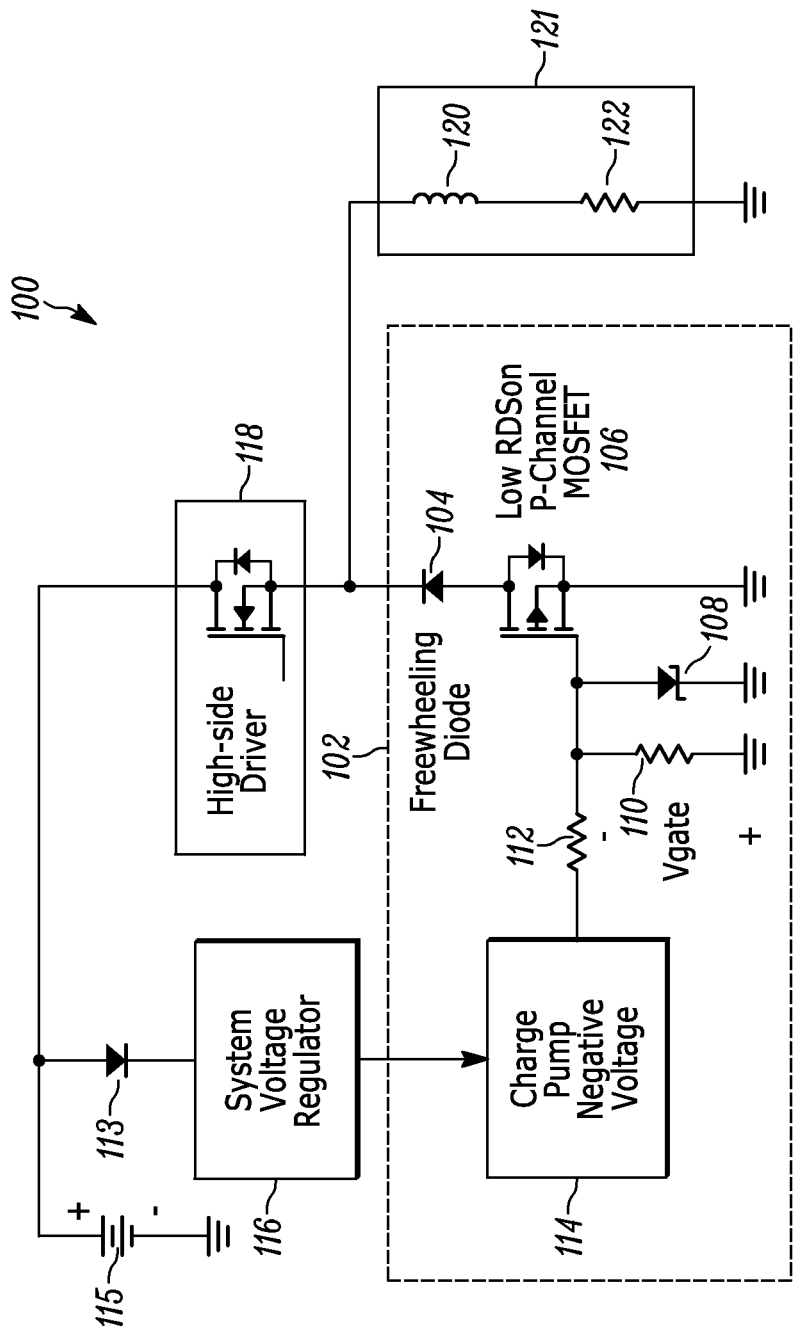
FIG. 1 comprises a circuit diagram of a system that utilizes a MOSFET to provide circuit protection according to various embodiments of the present invention.

Referring now to FIG. 1, a system 100 includes a protection apparatus 102 (including a freewheeling diode 104, a P-channel MOSFET 106, a diode 108, a first resistor 110, a second resistor 112, a diode 113, and a charge pump 114), a battery 115, a system voltage regulator 116, a high side driver 118, and a load 121 that can be represented as an inductor 120 and a resistor 122.

The freewheeling diode 104 operates to recirculate energy (voltage and current) when the driver 118 opens. The recirculated energy alleviates the problem of overvoltage or overcurrent conditions because of the presence of the inductor 120.

The P-channel MOSFET 106 is a p-channel device as known to those skilled in the art. In one example, the MOSFET 106 comprise a low RDS-on resistance when switched on. In some examples, the low RDS-on resistance is between approximately 100 ohms and 0.001 ohms. Other examples are possible.

The diode 108 acts as a protection device for the MOSFET 106 to prevent damage to the MOSFET 106 when the input voltage at the gate of the MOSFET 106 exceeds operating levels that might damage the MOSFET 106.

The first resistor 110 and second resistor 112 provide a resistor divider that reduces the voltage presented at the gate of the MOSFET 106. The charge pump 114 receives a voltage from voltage regulator 116, multiplies that voltage by a value, and inverts the voltage. For example, the charge pump may receive +3 volts, multiple this by a factor of 3 (giving 9 volts), and reversing the sign (giving −9 volts) to be presented to the MOSFET 106 (after being reduced by the divider formed by resistors 110 and 112). It will be appreciated that this is one example and that other examples are possible. The diode 113 prevents current and voltage from being received at the regulator 116 when a reverse battery condition or operating mode occurs. By reverse battery condition or operating mode, it is meant that the polarity of the battery 115 is switched from positive (as shown in the figures so that it supplies a positive voltage) to negative (where the battery 115 supplies a negative voltage). Normal operating mode means the battery has a positive voltage The battery 115 supplies voltage and current to the system and in one example may be an automotive battery disposed in a vehicle. In this respect, the system 100 may be a system disposed in a vehicle (e.g., car, truck). A user may mistakenly install the battery in a reverse battery mode of operation (supplying a negative voltage) and the present approaches prevent damage of circuit components when this situation occurs.

The system voltage regulator 116 provides noise-reduced or noise free voltages to the charge pump 114. The high side driver 118 may in one example be a switch but may include various elements such as diodes. The driver 118 may be controlled (opened or closed) by an external microcontroller, for example, as used in an engine controller. The load 121 that can be represented as an inductor 120 and a resistor 122. In one example, the load 121 is a harness, a windshield wiper motor, washer motor, or solenoid. Other examples are possible.

In one example, the MOSFET 106 is a low RDS-on P-Channel MOSFET and this is used to provide a ground path to the freewheeling diode 104. The P-Channel MOSFET 106 is switched ON by a negative voltage supplied at its gate. As the resistance of the P-Channel MOSFET 106 is very low (e.g., 100 to 0.001 ohms), the energy absorbed by the MOSFET 106 during a freewheeling event is quite low. As shown below with respect to FIG. 2, the MOSFET 106 can be shared among multiple freewheeling diodes on the system. In case of a reverse battery event, the P-Channel MOSFET is switched off disconnecting the freewheeling diodes from the ground path. The circuit provides a very good protection against inductive events (freewheeling diode operating) as well as reverse battery events.

In some examples, normally the MOSFET 106 is on (as a switch it is closed and its channel is open), power flows to the load 121. The driver 118 is turned off (opens as a switch) and the voltage on the load 121 reverses. The MOSFET 106 is saturated. As the voltage becomes negative, the freewheeling diode 104 gets a current which it recirculates to the load 121. Without the MOSFET 106, the diode 104 would not be connected in parallel to the load, thus the inductor voltage would increase above the operating ratings of the driver 118 causing it to be destroyed.

In one aspect and in a normal operating mode, the charge pump 114 receives a voltage from the voltage regulator 116, and is configured to multiply and reverses the polarity of the voltage to supply to the gate of the MOSFET 106. In a reverse battery operating mode, the charge pump 114 receives no voltage from the voltage regulator 116 (because the diode 113 prevents voltage and current from being received at the regulator 113) to supply to the gate of the MOSFET 106 causing the MOSFET 106 to deactivate. When the MOSFET 106 deactivates, current is prevented from flowing through the freewheeling diode 104 to protect the freewheeling diode 104 from overvoltage or overcurrent conditions.

Figure 2:
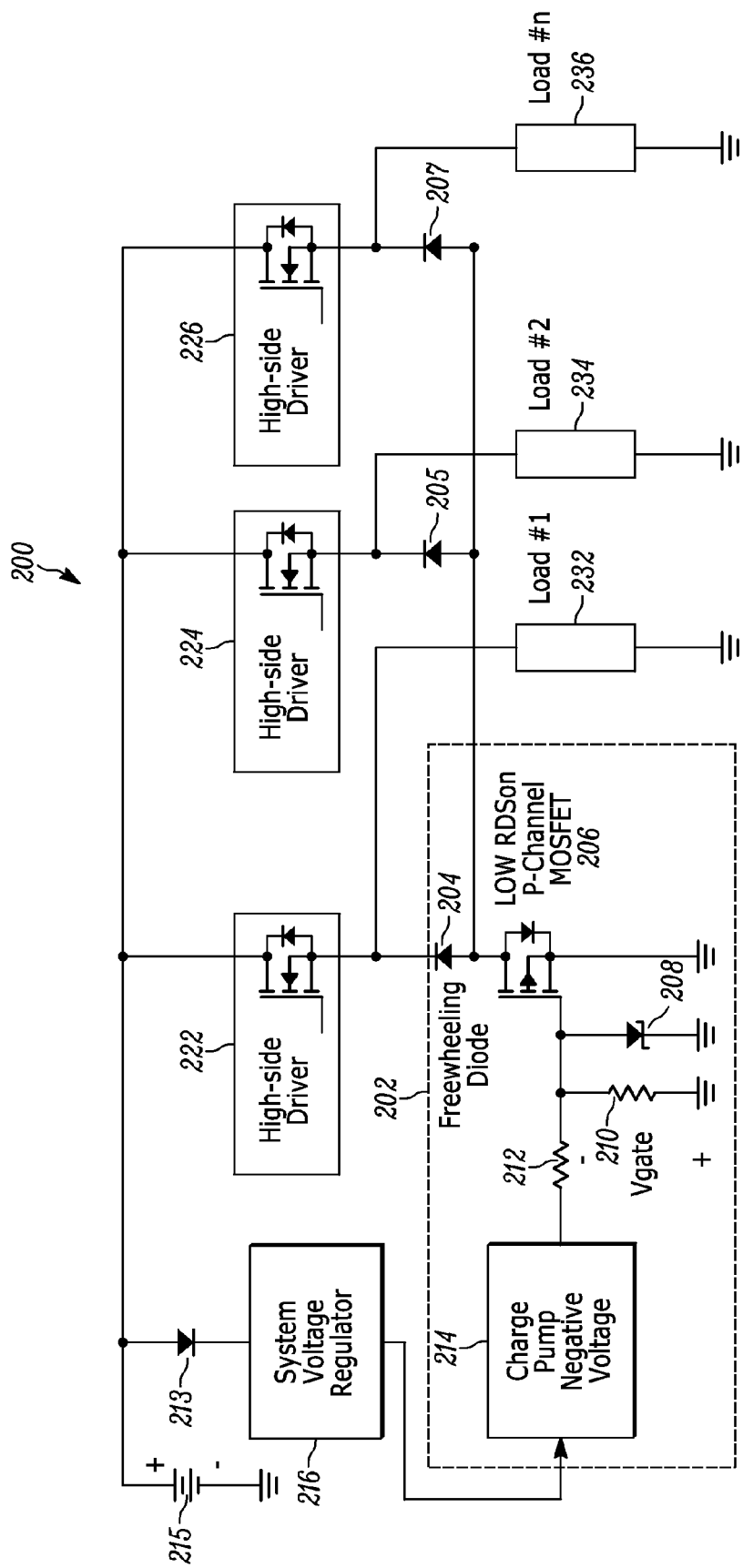
FIG. 2 comprises a system with multiple loads that utilizes a MOSFET to provide circuit protection according to various embodiments of the present invention.

Referring now to FIG. 2, a system 200 includes a protection apparatus 202 (including freewheeling diodes 204, 205, and 207, a P-channel MOSFET 206, a diode 208, a first resistor 210, a second resistor 212, diode 213, and a charge pump 214), a battery 215, a system voltage regulator 216, a first high side driver 222, a second high side driver 224, a third high side driver 226, a first load 232, a second load 234, and a third load 236.

The protection apparatus 202 (including freewheeling diode 204, P-channel MOSFET 206, diode 208, first resistor 210, second resistor 212, diode 213, and charge pump 214), battery 215, and system voltage regulator 216 operate as do the like-numbered elements associated with FIG. 1 and that description will not be repeated here.

In this case, the protection apparatus 202 provides protection for the whole system 200 when a reverse battery condition occurs (i.e., the polarity of the battery 215 is reversed) and when any of the drivers 222, 224, or 226 are opened.

The MOSFET 206 is shared among multiple freewheeling diodes 204, 205, and 207 on the system. In case of a reverse battery event, the P-Channel MOSFET 206 is switched off disconnecting the freewheeling diodes 204, 205, and 207 from the ground path. The circuit provides a very good protection against inductive events (freewheeling diode operating) as well as reverse battery events or modes of operation.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An apparatus for providing protection to an electric circuit, comprising:
   a P-channel MOSFET;
   a freewheeling diode coupled to a drain of the P-channel MOSFET and coupled to a load;
   a charge pump coupled to a gate of the P-channel MOSEFT;
   such that in a normal operating mode, the charge pump receives a voltage from a voltage regulator, and is configured to multiply and reverses the polarity of the voltage to supply to the gate of the MOSFET;
   such that in a reverse battery operating mode, the charge pump receives no voltage from the voltage regulator to supply to the gate of the MOSFET causing the MOSFET to deactivate;
   such that when the MOSFET deactivates, current is prevented from flowing through the freewheeling diode to protect the freewheeling diode.

2. The apparatus of claim 1, wherein when a driver switch to a load opens, the MOSFET and freewheeling diode cooperate to recirculate current in the load.

3. The apparatus of claim 1, wherein the load comprises a harness, a windshield wiper motor, washer motor, or solenoid.

4. The apparatus of claim 1, wherein the MOSFET comprise a low RDS-on resistance.

5. The apparatus of claim 4, wherein the low RDS-on resistance is between approximately 100 ohms and 0.001 ohms.

6. The apparatus of claim 1, further comprising a voltage divider network coupled to the gate of the MOSFET.

7. The apparatus of claim 1, further comprising a voltage protection diode coupled to the gate of the MOSFET.

8. A method of operating a protection circuit that includes a P-channel MOSFET, a freewheeling diode coupled to a drain of the P-channel MOSFET and coupled to a load, and a charge pump coupled to a gate of the P-channel MOSEFT, the method comprising:

in a normal operating mode, receiving a voltage from a voltage regulator at the charge pump, and at the charge pump multiplying and reversing the polarity of the voltage and supplying the reversed-polarity and multiplied voltage to the gate of the MOSFET;

in a reverse battery operating mode, receives no voltage from the voltage regulator at the charge pump and supplying no voltage to the gate of the MOSFET causing the MOSFET to deactivate;

when the MOSFET deactivates, preventing current from flowing through the freewheeling diode to protect the freewheeling diode.

9. The method of claim 8, wherein when a driver switch to a load opens, the MOSFET and freewheeling diode cooperate to recirculate current in the load.

10. The method of claim 8, wherein the load comprises a harness, a windshield wiper motor, washer motor, or solenoid.

11. The method of claim 8, wherein the MOSFET comprise a low RDS-on resistance.

12. The method of claim 11, wherein the low RDS-on resistance is between approximately 100 ohms and 0.001 ohms.

13. The method of claim 8, wherein the protection circuit further comprises a voltage divider network coupled to the gate of the MOSFET.

14. The method of claim 8, wherein the protection circuit further comprises a voltage protection diode coupled to the gate of the MOSFET.

* * * * *